(12) United States Patent
Pompea et al.

(10) Patent No.: US 11,492,013 B2
(45) Date of Patent: Nov. 8, 2022

(54) VEHICLE FLEET MANAGEMENT HAVING A HIERARCHY OF PRIORITY FACTORS

(71) Applicant: Robert Bosch GmbH, Stuttgart (DE)

(72) Inventors: Ralph Pompea, Davisburg, MI (US); David Kovacek, Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/768,072

(22) PCT Filed: Nov. 9, 2018

(86) PCT No.: PCT/EP2018/080729
§ 371 (c)(1),
(2) Date: May 28, 2020

(87) PCT Pub. No.: WO2019/105714
PCT Pub. Date: Jun. 6, 2019

(65) Prior Publication Data
US 2020/0317223 A1 Oct. 8, 2020

Related U.S. Application Data

(60) Provisional application No. 62/592,765, filed on Nov. 30, 2017.

(51) Int. Cl.
*B60W 60/00* (2020.01)
*G01C 21/34* (2006.01)
(Continued)

(52) U.S. Cl.
CPC ..... *B60W 60/0025* (2020.02); *G01C 21/3407* (2013.01); *G01C 21/3461* (2013.01);
(Continued)

(58) Field of Classification Search
CPC ............ G08G 1/0965; G06Q 30/0201; B60W 60/0025; G01C 21/3691; G05D 1/0088
(Continued)

(56) References Cited

U.S. PATENT DOCUMENTS

| 2002/0186144 A1* | 12/2002 | Meunier | ................ G07B 15/00 340/901 |
| 2005/0187677 A1* | 8/2005 | Walker | ................... B64C 13/20 701/16 |

(Continued)

FOREIGN PATENT DOCUMENTS

DE  10 2008 062 119 A1  6/2010

OTHER PUBLICATIONS

International Search Report corresponding to International Patent Application No. PCT/EP2018/080729, dated May 9, 2019 (6 pages).
(Continued)

*Primary Examiner* — Alexander G Kalinowski
*Assistant Examiner* — Sanjeev Malhotra
(74) *Attorney, Agent, or Firm* — Maginot, Moore & Beck LLP (57) ABSTRACT

A system for managing a fleet of vehicles having autonomous or semi-autonomous control based upon real-time data analysis of live driving conditions including traffic conditions, weather conditions, pollution conditions, vehicle operations, vehicle emissions, legal restrictions, and fleet conditions. Older vehicles may be retrofitted with partial or total compatibility with the system via an aftermarket dongle that connects to the vehicle through a diagnostic port.

7 Claims, 4 Drawing Sheets

(51) Int. Cl.
*G01C 21/36* (2006.01)
*G05D 1/00* (2006.01)
*G06Q 10/04* (2012.01)
*G06Q 10/06* (2012.01)
*G06Q 20/08* (2012.01)
*G06Q 20/10* (2012.01)
*G06Q 40/02* (2012.01)
*G06Q 50/26* (2012.01)
*G06Q 50/30* (2012.01)
*G07C 5/00* (2006.01)
*G07C 5/08* (2006.01)
*G08G 1/00* (2006.01)
*G06Q 30/00* (2012.01)

(52) U.S. Cl.
CPC ..... *G01C 21/3492* (2013.01); *G01C 21/3691* (2013.01); *G05D 1/0088* (2013.01); *G06Q 10/047* (2013.01); *G06Q 10/06315* (2013.01); *G06Q 20/085* (2013.01); *G06Q 20/108* (2013.01); *G06Q 40/02* (2013.01); *G06Q 50/26* (2013.01); *G06Q 50/30* (2013.01); *G07C 5/006* (2013.01); *G07C 5/085* (2013.01); *G07C 5/0808* (2013.01); *G08G 1/20* (2013.01); *G05D 2201/0213* (2013.01); *G06Q 30/018* (2013.01); *G06Q 2240/00* (2013.01)

(58) Field of Classification Search
USPC .... 701/16, 31.4; 705/14.46, 14.53, 4, 14.62; 340/4.6, 901
See application file for complete search history.

(56) References Cited

U.S. PATENT DOCUMENTS

| | | | |
|---|---|---|---|
| 2006/0287783 A1* | 12/2006 | Walker | H04Q 9/00 701/31.4 |
| 2007/0290839 A1 | 12/2007 | Uyeki et al. | |
| 2013/0297418 A1* | 11/2013 | Collopy | G06Q 30/0273 705/14.62 |
| 2016/0140614 A1* | 5/2016 | Brubaker | G06Q 30/0269 705/14.62 |
| 2017/0262790 A1* | 9/2017 | Khasis | G08G 1/012 |
| 2017/0328725 A1 | 11/2017 | Schlesinger et al. | |
| 2017/0337813 A1* | 11/2017 | Taylor | G05D 1/0285 |
| 2017/0372431 A1* | 12/2017 | Perl | G06Q 40/08 |
| 2018/0004213 A1* | 1/2018 | Absmeier | B60W 30/0956 |
| 2018/0025430 A1* | 1/2018 | Perl | B60R 16/0231 705/4 |
| 2018/0047107 A1* | 2/2018 | Perl | G06Q 20/10 |
| 2018/0075380 A1* | 3/2018 | Perl | G06Q 50/30 |
| 2018/0099678 A1* | 4/2018 | Absmeier | A61B 5/4803 |
| 2018/0300816 A1* | 10/2018 | Perl | G06Q 40/08 |
| 2018/0373268 A1* | 12/2018 | Antunes Marques Esteves | B60L 58/12 |
| 2018/0375939 A1* | 12/2018 | Magalhães de Matos | H04L 41/12 |
| 2018/0376305 A1* | 12/2018 | Ramalho de Oliveira | H04W 4/44 |
| 2018/0376306 A1* | 12/2018 | Ramalho de Oliveira | H04W 88/10 |
| 2019/0066409 A1* | 2/2019 | Moreira da Mota | G07C 5/0808 |
| 2019/0174276 A1* | 6/2019 | Mineiro Ramos de Azevedo | H04W 4/38 |
| 2019/0176862 A1* | 6/2019 | Kumar | B64D 47/08 |
| 2019/0205115 A1* | 7/2019 | Gomes | H04W 4/50 |
| 2019/0215670 A1* | 7/2019 | Ameixieira | H04W 76/10 |
| 2019/0349794 A1* | 11/2019 | Tavares Coutinho | H04L 67/52 |
| 2019/0368882 A1* | 12/2019 | Wheeler | H04L 67/52 |
| 2020/0092694 A1* | 3/2020 | Chen | H04W 4/40 |
| 2020/0114753 A1* | 4/2020 | Biderman | H02P 6/08 |
| 2020/0255141 A1* | 8/2020 | Lavie | G08G 1/0133 |
| 2020/0317216 A1* | 10/2020 | Konrardy | B60W 30/182 |
| 2021/0039513 A1* | 2/2021 | Konrardy | B60R 21/34 |
| 2021/0081624 A1* | 3/2021 | Kovarik | G06K 7/10376 |

OTHER PUBLICATIONS

PCT International Search Report for PCT/EP2018/080729.

* cited by examiner

Fig. 4

VEHICLE FLEET MANAGEMENT HAVING A HIERARCHY OF PRIORITY FACTORS

CROSS-REFERENCE TO RELATED APPLICATIONS

This application is a 35 U.S.C. § 371 National Stage Application of PCT/EP2018/080729 filed on Nov. 9, 2018, which claims the benefit of U.S. Provisional Application No. 62/592,765, filed on Nov. 30, 2017, the disclosures of which are herein incorporated by reference in their entirety.

TECHNICAL FIELD

This disclosure relates to control and navigation of autonomous or semi-autonomous vehicles.

BACKGROUND

Driver assisted vehicles may comprise autonomous or partially-autonomous functions to increase the safety and reliability of the vehicle's performance. Commercial vehicles may also benefit from autonomous or partially-autonomous functions for the same reasons, especially if the autonomous or partially-autonomous functions increased compliance with legal regulations. Vehicles having different functional purpose (e.g., passenger delivery, courier, etc.) may have different requirements or desirable functional behavior. Thus a system for controlling the autonomous or partially-autonomous functions of a commercial vehicle or fleet of vehicles in order to best comply with the desired functional behavior and legal regulations applicable to the vehicle or fleet is desired.

SUMMARY

One aspect of this disclosure is directed to a method of optimizing the route of a vehicle navigating to a destination locus. The optimization comprises acquiring a set of driving condition data describing the operations of the vehicle and the environment during travel, and then finding a best route for navigation. The best route for navigation may be determined by analyzing the driving condition data with respect to a hierarchy of priority factors. In some embodiments of the aspect, the hierarchy of priority factors may be configurable to reflect the designated purpose of the vehicle. In some embodiments of the aspect, the method may modify the functional behavior of the vehicle instead of, or in addition to, the navigational functions.

Another aspect of this disclosure is directed to a vehicle fleet management system comprising a fleet processor that is operable to control the function and navigation of a number of vehicles according to a hierarchy of priority factors. The fleet processor may utilize data provided by the vehicles of the fleet management system or data from a third-party source to direct each of the vehicles according to the hierarchy of priority factors. In some embodiments of the aspect, the hierarchy of priority factors may be vehicle-specific.

A further aspect of this disclosure is directed to a vehicle navigation system for a vehicle having an autonomous function that is coordinated based upon a hierarchy of priority factors. The vehicle navigation system may comprise number of sensors to monitor the operations of the vehicle or the environmental conditions surrounding the vehicle. The vehicle navigation system may comprise a vehicle control unit operable to control the functions of the vehicle, including navigational functions, in response to the data collected by the number of sensors or acquired during data communication with a network processor.

According to yet another aspect of the disclosure, passengers of a vehicle having a vehicle navigation system according to an embodiment of this disclosure may be provided with an interface to initiate a reconfiguration of the hierarchy of priority factors, such as an interface for initiating payment of a fee to adjust compliance requirements.

In some embodiments, a fleet of commercial vehicles having autonomous or partially-autonomous functions may be managed and coordinated to advantageously optimize the utility and performance of the fleet. A fleet of autonomous vehicles may advantageously reduce human labor requirements for driving or navigation, minimize costs by optimizing navigational routes with respect to fuel consumption or driving fees, and additionally optimizing the operability of the vehicles by reporting for routine maintenance or repair at an earlier opportunity.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
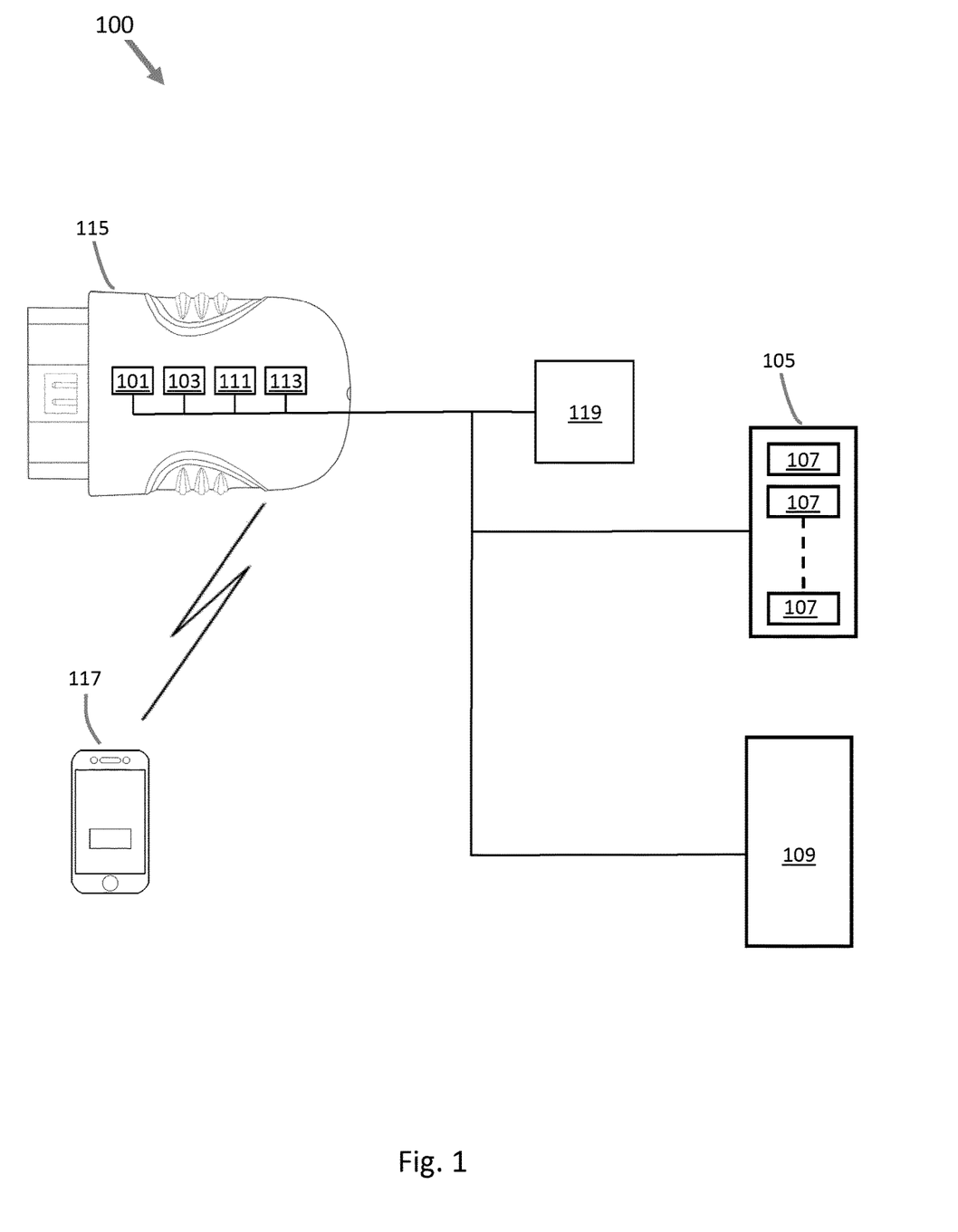
FIG. 1 is a diagrammatic illustration of a vehicle navigation system.

FIG. 1 shows a diagrammatic view of the components of an autonomy control system 100 according to one embodiment of the teachings disclosed herein. Autonomy control system 100 is at least partially disposed within a vehicle (not shown) having an autonomous function. In some embodiments, the autonomous function may comprise a complete autonomous operation of the vehicle. In some embodiments, the autonomous function may comprise only a portion of the total functions of the vehicle. FIG. 1 depicts an embodiment wherein the autonomy control system 100 comprises a vehicle navigation system for controlling the navigation of the vehicle, but other embodiments may comprise other configurations without deviating from the teachings disclosed herein.

Autonomy control system 100 is coordinated by a vehicle processor 101. Vehicle processor 101 is in data communication with a vehicle memory 103. In some embodiments, vehicle memory 103 is operable to provide instructions to vehicle processor 101 in the form of executable program code. In some embodiments, vehicle memory 103 comprises a data store.

Autonomy control system 100 further comprises a sensor array 105 in data communication with vehicle processor

101. Sensor array 105 comprises a number of sensors 107 operable to monitor and measure conditions of the vehicle. Sensors 107 may be operable to measure the operational metrics of the vehicle, such as the moving speed, acceleration, braking force, tachometry, stoichiometry, emissions, fuel consumption, brake wear, or any other measurable performance characteristic of vehicle operation. Sensors 107 may be operable to monitor the operational status of vehicle components, such as tire pressure, fuel supply, door open/close status, engine temperature, vehicle cargo weight, vehicle cargo volume, vehicle passenger count, vehicle passenger weight, or any other measurable status of a vehicle component. Sensors 107 may be operable to monitor the environmental conditions of the vehicle, such as external temperature, internal temperature, external humidity, barometric pressure, environmental pollution, navigational status (such as global positioning coordinates), local time, proximity to other vehicles, proximity to buildings, proximity to moving objects, proximity to pedestrians, proximity to stationary objects, icy road conditions, or any other detectable environmental condition characterizing the environment surrounding the vehicle. In the depicted embodiment, autonomy control system 100 comprises all of these sensors, but other embodiments may comprise other configurations having fewer or additional sensors 107 without deviating from the teachings disclosed herein. Sensors 107 are depicted in FIG. 1 as being disposed within a common grouping to form sensor array 105, but other embodiments may comprise other arrangements without deviating from the teachings disclosed herein. In some embodiments, sensors 107 may be disposed at distinct points within the vehicle to optimize the operation of each respective sensor.

Autonomy control system 100 further comprises a vehicle control unit 109 in data communication with vehicle processor 101. Vehicle control unit 109 is operable to control or adjust autonomous functions of the vehicle, and is further operable to accept commands from vehicle processor 101. In some embodiments, vehicle control unit 109 comprises a number of electronic vehicle control units (ECUs), but other embodiments may comprise a single control device disposed within the vehicle systems, a combination of a specialized processors, or any other alternative configuration known to one of ordinary skill without deviating from the teachings disclosed herein. In some embodiments, vehicle control unit 109 may be operable to monitor the status of components it is operable to control and provide data indicating component status, such as a diagnostic trouble code (DTC) or other status data. In some embodiments, vehicle control unit 109 may be operable to interact with one or more of sensors 107, or with other sensors unassociated with sensor array 105, to monitor the status of the vehicle components.

Vehicle processor 101 may be operable to collect data from the sensor array 105 and vehicle control unit 109 and store it in memory 103 as a set of driving conditions data. Other data not originating from the sensor array 105 or vehicle control unit 109 may also be useful. Autonomy control system 100 further comprises a receiver 111 in data communication with vehicle processor 101 and operable to accept additional data or commands from a network processor (not shown). Data accepted from the network processor may additionally be collected into the set of driving conditions data. Autonomy control system 100 further comprises a transmitter 113 in data communication with vehicle processor 101 and operable to transmit data to the network processor. In some embodiments, receiver 111 and transmitter 113 may comprise a single transceiver. Receiver 111 and transmitter 113 may be configured to communicate wirelessly with the network processor via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. Some embodiments may comprise a wired connection between the autonomy control system 100 and the network processor.

In the depicted embodiment, vehicle processor 101 compiles the set of driving conditions data and transmits the driving conditions data to the network processor. The network processor is then operable to further compile the transmitted driving conditions data with additional driving conditions data (such as data obtained from a third-party provider), forming a set of combined driving conditions data. In the depicted embodiment, the network processor is then operable to analyze the combined driving conditions data with respect to a hierarchy of priority factors, and transmit commands to receiver 111 to reconfigure the vehicle to comply with the hierarchy of priority factors. In some embodiments, vehicle processor 101 may be operable to perform the analysis with respect to the hierarchy of priority factors.

The priority factors of the hierarchy of priority factors comprise conditional requirements of the autonomous functions of the vehicle. For example, in order to achieve an optimized navigation of the vehicle, the analysis of the driving conditions data may be used to populate a number of navigable paths for the vehicle to travel to a destination locus. The navigable paths may be populated based upon pre-determined conditions set by the priority factors. Common priority factors for navigation may include shortest distance, shortest time of travel, most use of highways, least use of highways, greatest fuel efficiency, minimized time spent at full stop, avoidance of particular traffic conditions, avoidance of particular weather conditions, or avoidance of toll roads. Some embodiments may comprise a priority factor directed to compliance with particular or special laws and regulations required by local municipalities, such as temporary emissions restrictions or minimum occupancy requirements (e.g., "high-occupancy vehicle" or "HOV" restrictions). If the vehicle belongs to a fleet of vehicles, the fleet conditions, such as the status, location, and functions of the other fleet vehicles, may be included within the hierarchy of priority factors. Some embodiments may comprise other combinations of priority factors—including embodiments having fewer priority factors or additional priority factors not disclosed herein—without deviating from the teachings disclosed herein.

Some embodiments may comprise different hierarchies of the priority factors. For example, an embodiment that is configured to prioritize vehicle travel efficiency may utilize a hierarchy giving precedence to minimizing travel time instead of minimizing fuel consumption. Another embodiment prioritizing low pollution may utilize a hierarchy giving precedence to reduced emissions over travel speed. Another embodiment prioritizing minimal cost may utilize a hierarchy giving precedence to avoiding toll roads instead of minimizing travel distance. These embodiments are included for the purpose of example, and not limitation: other embodiments may comprise other hierarchies having other configurations without deviating from the teachings herein. Some embodiments may comprise a configurable hierarchy of priority factors.

FIG. 1 further depicts an embodiment wherein portions of autonomy control system 100 are disposed within a vehicle dongle 115 operable to interface with a diagnostic port of the vehicle (not shown). In the depicted embodiment, the vehicle dongle 115 comprises vehicle processor 101, memory 103, receiver 111, and transmitter 113, but other embodiments may comprise other configurations without deviating from the teachings disclosed herein. In some embodiments, other or all components of autonomy control system 100 may be disposed within dongle 115. Some embodiments of autonomy control system 100 may not comprise dongle 115. Advantageously, a dongle embodiment may permit existing vehicles having some autonomous or partially-autonomous functions to be retrofitted with some or all features of autonomy control system 100.

In the embodiment depicted in FIG. 1, autonomy control system 100 further comprises an interface device 117 in data communication with vehicle processor 101, operable to provide a user interface to a user of autonomy control system 100. Interface device 117 may be operable for a user to monitor the status and operations of autonomy control system 100. In some embodiments, interface device 117 may be operable for a user to perform and assess diagnostics of autonomy control system 100. In some embodiments, interface device 117 may be operable for a user to control vehicle functions via vehicle control unit 109. In some embodiments, interface device 117 may be operable for a user to reconfigure the hierarchy of priority factors used for autonomous function. In the depicted embodiment, interface device 117 comprises a mobile device in wireless data communication with vehicle processor 101 via receiver 111 and transmitter 113. The mobile device may be in wireless communication with vehicle processor 101 via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In the depicted embodiment, the mobile device of interface device 117 comprises a smart phone, but other embodiments may comprise a mobile processing device, a tablet computer, a personal computer, a wearable computing device, a personal digital assistant (PDA) device, a portable computing device, a specialized diagnostic tool, or any other alternative embodiment known to one of ordinary skill in the art. In some embodiments, interface device 117 may instead comprise a device or component in wired data communication with vehicle processor 101, such as a vehicle head unit, in-situ vehicle processor, specialized processor, specialized diagnostic tool, or any other configuration known to one of ordinary skill in the art. In some embodiments, the device of interface device 117 may comprise a display and interface device operably coupled to vehicle processor 101. In some embodiments, interface device 117 may comprise a device that also comprises one or more of vehicle processor 101, memory 103, sensor array 105, one or more of sensors 107, vehicle control unit 109, receiver 111, transmitter 113, or other vehicle components. In some such embodiments, interface device 117 may comprise a vehicle head unit, an onboard computer, a native OEM processor, an aftermarket processor, an interface operatively coupled to the network processor, or any other alternative configuration known to one of ordinary skill in the art without deviating from the teachings disclosed herein.

Some embodiments may comprise a combination of interface devices 117 having distinct configurations. For example, a user acting as a fleet coordinator of a fleet of vehicles each having an autonomy control system 100 may utilize an interface operably coupled to the network processor, while passengers of each vehicle in the fleet may utilize an additional interface device comprising a smart phone. In this example, the operability of the fleet coordinator's interface device may be in communication with each vehicle of the fleet, while the passenger's interface device may be in communication only with the respective associated vehicle. As a further example, the fleet coordinator's interface device may be operable for control of each vehicle in the fleet, while the passenger's interface device may only permit monitoring of the status of the respective associated vehicle. This embodiment is included for purpose of example, and not limitation: other embodiments may comprise other configurations of interface devices 117. Some embodiments may not comprise an interface device 117.

Autonomy control system 100 may also be operable to initiate monetary transfers between a payment source and a payment recipient. Each of the payment source and payment recipient may comprise a bank account, credit account, micro-currency account, cryptocurrency account, or any other fund known to one of ordinary skill without deviating from the teachings disclosed herein. Some embodiments of autonomy control system 100 may be operable to initiate the monetary transfers for driving-based transactions via vehicle processor 101, interface device 117, an optional payment-exchange component 119, the network processor, or some combination thereof. In some embodiments, some or all monetary transfers may be initiated and completed by different components of autonomy control system 100.

Driving-based transactions may comprise road tolls, fees required by municipalities or law enforcement, ticketing fees, parking fees, payments for shuttle services, payments for fuel, payments for maintenance or repair of the vehicle, or any other payment arrangement known to one of ordinary skill in the art without deviating from the teachings herein. Each of the payment source and payment recipient may be associated with a user of the vehicle, an owner of the vehicle, a manager of the vehicle, a fleet to which the vehicle belongs, a municipality, a toll-collection agency, a fee-collection agency, a law enforcement organization, a commercial service provider, or any other entity authorized to receive payments in driving-based transactions known to one of ordinary skill. In some embodiments, payment-exchange component 119 may be operable to detect toll-road beacons that indicate entrance of a toll road to initiate payment. In some embodiments, payment-exchange component 119 may comprise a transponder operable to emit a detectable beacon signal compatible with toll-road systems, such as a radio frequency identification (RFID) system or any other alternative beacon signal configuration known to one of ordinary skill.

By way of example, and not limitation, one embodiment of autonomy control system 100 may be operable to provide shuttle service for passengers. Passengers may utilize a personal smart phone to provide the functions of interface device 117, including an interface with payment-exchange component 119 of the vehicle. Upon successful arrival of the passenger at a desired destination locus, the passenger may initiate proper payment for the ride using their own smart phone. After payment is initiated and completed, the autonomy control system 100 may stop communication with the passenger's smart phone, and seek a new passenger. The new passenger's smart phone will then act as interface device 117 for the duration of the next trip.

Figure 2:
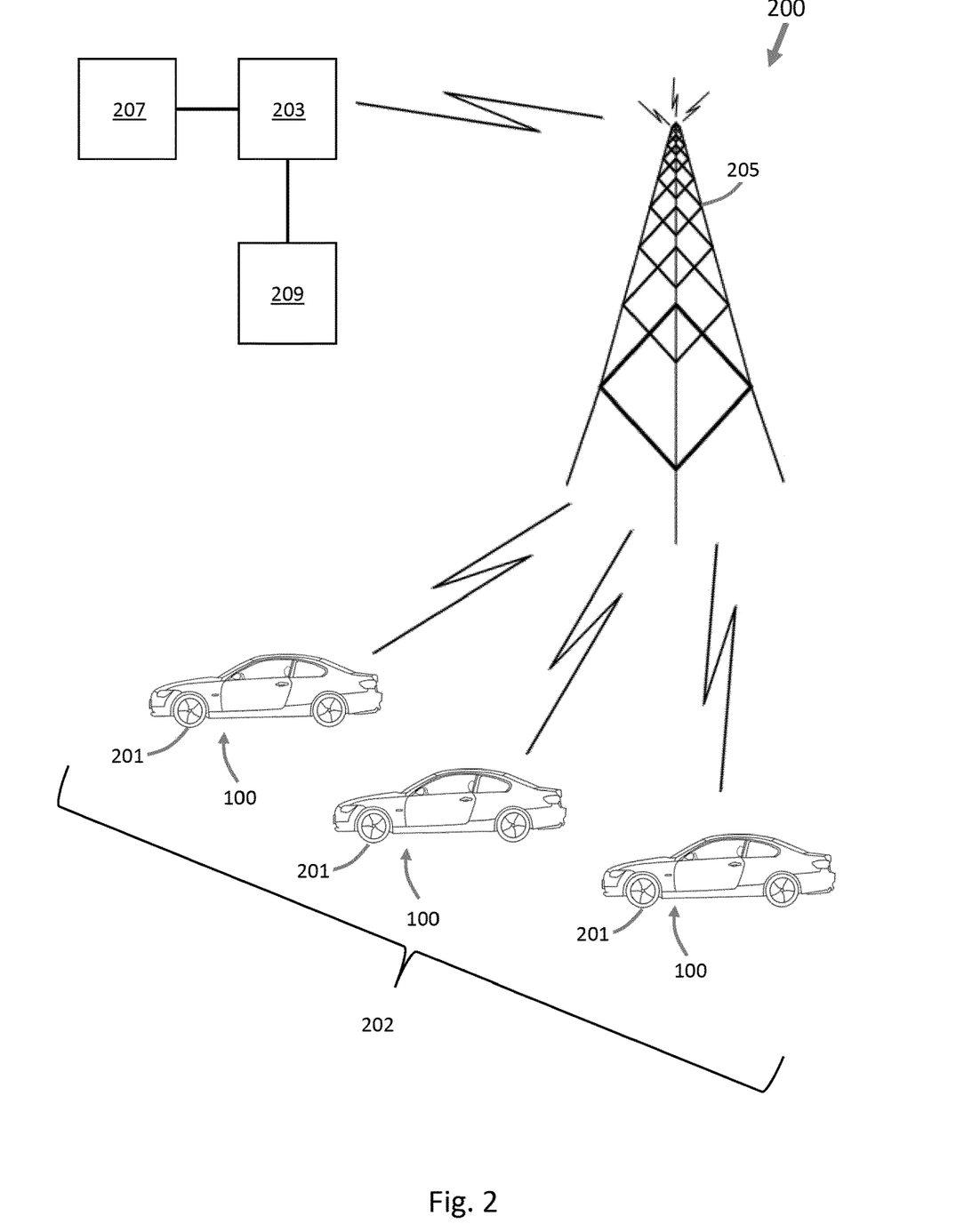
FIG. 2 is a diagrammatic illustration of a fleet management system.

FIG. 2 is a diagrammatic illustration of a fleet management system 200 for controlling a number of vehicles 201. The number of vehicles 201 may be collectively referred to as a fleet 202 of vehicles. Each of vehicles 201 comprise autonomous or partially-autonomous functions. As depicted in FIG. 2, each of vehicles 201 comprises autonomy control system 100 (see FIG. 1). However, other embodiments may comprise other embodiments of autonomous or partially-autonomous functions. In some embodiments of fleet management system 200, vehicles 201 may comprise different autonomous features having different functional levels of compatibility with fleet management system 200.

Fleet management system 200 further comprises a fleet processor 203 in wireless data communication with each of vehicles 201. Fleet processor 203 may be operable to coordinate the operation of fleet 202. The size of fleet 202 is depicted as three vehicles 201 in FIG. 2, but this representation is intended to be illustrative and not limiting. Fleet 202 may comprise any number of vehicles 201 without deviating from the teachings disclosed herein. Fleet 202 may be comprised of a number of active vehicles and a number of inactive vehicles to comprise the totality of vehicles 201. Some of active vehicles 201 in an active mode may be placed into an inactive mode and vice-versa.

Fleet processor 203 may provide the functions of the network processor disclosed above with respect to FIG. 1. In some embodiments, fleet processor 203 may provide other functions in addition to, or instead of, the functions described above.

Fleet processor 203 is in wireless communication with fleet 202 via a fleet transceiver 205. In the depicted embodiment, fleet transceiver 205 is in wireless communication with fleet processor 203, but other embodiments may comprise other configurations without deviating from the teachings disclosed herein. Fleet transceiver 205 may be in wireless communication with each of vehicles 201 via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In some embodiments, fleet transceiver 205 may utilize different wireless connectivity protocols for vehicles 201 having distinct operability. Fleet transceiver 205 may be in wireless communication with fleet processor 203 via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In some embodiments, fleet transceiver 205 may be in data communication with fleet processor 203 using a wired connection, such as a local area network (LAN), Internet protocol connection, plain-old-telephone-service (POTS) connection, TCP/IP connection, distributed processing network, an electrical wiring, a conductive channel, an electrical bus, a fiber optic pathway, or any other alternative configuration known to one of ordinary skill in the art without deviating from the teachings disclosed herein.

Fleet processor 203 may be embodied as a network server, a mainframe processor, a system of processors distributed across a network, a system of processors configured in wired or wireless communication, a mobile processing device, a smartphone, a tablet computer, a laptop computer, a wearable computing device, a desktop computer, a personal digital assistant (PDA) device, a handheld processor device, a specialized processor device, or any other alternative embodiment known to one of ordinary skill in the art.

Fleet processor 203 may be operable to acquire vehicle driving conditions data from fleet 202. In the depicted embodiment, the driving conditions data may comprise data from the sensor arrays 105 or vehicle control units 109 of the autonomy control system (see FIG. 1) of each respective vehicle 201. Fleet processor 203 may be operable to store the vehicle driving conditions data to a fleet data store 207 for later analysis, or may perform a real-time analysis of the vehicle driving conditions data. Fleet processor 203 may also be in data communication with an information server 209 to acquire additional server driving conditions data. Information server 209 may be in data communication with fleet processor 203 using any or all of the communication methods described above with respect to fleet processor 203 and fleet transceiver 205.

Information server 209 may comprise a third-party data source providing server driving conditions data comprising traffic data, navigational data, weather data, traffic data, road construction data, pollution data, or legal restrictions data. Information server 209 may provide server driving conditions data as part of a commercial service, a subscription-based data base, an open-access resource, a public repository, some combination of the above, or any other equivalent alternative configuration known to one of ordinary skill in the art without deviating from the teachings disclosed herein. Fleet processor 203 may be operable to acquire vehicle driving conditions data from fleet 202 or server driving conditions data from information server 209 to form a set of combined driving conditions data.

Fleet processor 203 may be operable to analyze the combined driving conditions data to determine whether adjustments to the operations of fleet 202 are appropriate. The determination is made based upon a hierarchy of priority factors. The priority factors of the hierarchy of priority factors provide conditional requirements for achieving an optimal operation of the functions of a vehicle. For example, the hierarchy of priority factors may dictate operation of a vehicle 201 in a most-efficient mode, or may dictate that the vehicle traverse distances in the least amount of time. The hierarchy of priority factors may be the same for the entirety of fleet 202, or individual vehicles 201 within fleet 202 may have distinct hierarchies to reflect distinct functional roles of each of vehicles 201. In some embodiments, the hierarchy of priority factors may be stored in fleet data store 207. In some embodiments, the hierarchy of priority factors may be programmed into fleet processor 203. In some embodiments, the hierarchy of priority factors for each vehicle 201 may be stored in a memory associated with each respective vehicle 201, such as a memory 103 (see FIG. 1). In some embodiments, the hierarchy of priority factors for each vehicle may be configurable. In the depicted embodiment, the hierarchy of priority factors are generally directed to an autonomous navigational function of each vehicle 201, but the hierarchy of priority factors may be directed to other functions of the vehicle, such as the aggressiveness of maneuvering in traffic or satisfactory collection of data using sensors 107 (see FIG. 1).

By way of example, and not limitation, FIG. 2 may represent control of fleet 202 with respect to coordinated navigation of each of the vehicles 201. Priority factors may comprise travel time, travel distance, local legal restrictions, traffic conditions, travel costs, weather conditions, pollution conditions, vehicle operations, vehicle restrictions, and fleet conditions. Other embodiments may comprise other priority factors, including other priority factors not listed without deviating from the teachings disclosed herein. Each of vehicles 201 in fleet 202 may be assigned a destination locus and a hierarchy of priority factors. Fleet processor 203 compiles a combined set of driving conditions data to populate a set of navigable routes for each vehicle 201. The navigable routes are populated using the current locus of each of vehicles 201 as an origin locus and an assigned destination locus. In some embodiments, the navigable route of a vehicle 201 may be updated in real-time during travel, or in response to a particular event such as a user request or unexpected driving condition. After population, the routes are organized to conform to the hierarchy of priority factors associated with each respective vehicle 201.

For example, if a vehicle 201 is designated for fast transit of passengers (e.g., to serve as an express shuttle service), the hierarchy of priority factors may prioritize minimal travel time, traffic conditions and minimal travel distance, and may neglect travel costs, weather conditions or pollution conditions. Thus, fleet processor 203 may select a navigable route that minimizes travel time and distance traveled while avoiding slow traffic conditions, but may utilize routes comprising toll roads and smoggy or wet road conditions.

In another example, if a vehicle 201 is designated to act as a budget parcel-delivery vehicle, the hierarchy of priority factors may prioritize travel costs, cargo conditions and fuel consumption, and may neglect travel time. Thus, fleet processor 203 may select a navigable route that avoids toll roads and ensures most-efficient use of cargo space and fuel, but may utilize an indirect or slow-moving roads.

In another example, if a vehicle 201 is designated to act as an emergency response vehicle, the hierarchy of priority factors may prioritize minimal travel time and traffic conditions, and may neglect local legal restrictions because of special authorization (e.g., to pass-through at stop lights, avoid paying tolls, utilize high-occupancy lanes, or surpass the speed limit). Thus, fleet processor 203 may select a navigable route that minimizes travel time without regard for normal legal driving restrictions.

In another example, if a vehicle 201 is in need or maintenance or minor repair, the hierarchy of priority factors may prioritize minimal travel costs and avoiding hazardous conditions, and may neglect travel time or travel distance. Thus, fleet processor 203 may select a navigable route that avoids tolls and driving conditions that may adversely affect the vehicles state of disrepair, but may utilize indirect or slow-moving roads.

In commercial embodiments of fleet 202, fleet processor 203 may be operable to initiate monetary transfers related to the operation of vehicles 201. Each transfer may be between a payment source and payment recipient in response to a driving-based transaction. Each of the payment source and payment recipient may comprise a bank account, credit account, micro-currency account, cryptocurrency account, or any other fund known to one of ordinary skill without deviating from the teachings disclosed herein. In some embodiments, some or all monetary transfers may be initiated and completed by an autonomy control system 100 of a vehicle 201 instead of fleet processor 203.

Driving-based transactions may comprise road tolls, fees required by municipalities or law enforcement, ticketing fees, parking fees, payments for shuttle services, payments for fuel, payments for maintenance or repair of the vehicle, or any other payment arrangement known to one of ordinary skill in the art without deviating from the teachings herein. Each of the payment source and payment recipient may be associated with a user of the vehicle, an owner of the vehicle, a manager of the vehicle, a fleet to which the vehicle belongs, a municipality, a toll-collection agency, a fee-collection agency, a law enforcement organization, a commercial service provider, or any other entity authorized to receive payments in driving-based transactions known to one of ordinary skill.

Fleet processor 203 may be further operable to analyze the combined driving conditions data to populate a set of map data corresponding to the combined driving conditions data. The map data may be used to prepare a visual reference of driving conditions, which may be useful to present to a user of fleet management system 200, such as a fleet coordinator or a passenger of a vehicle 201. For example, the map data may comprise visual representations of navigation of the vehicle, traffic conditions, weather patterns, pollution conditions, and legal restriction data. The visual reference of the map data may display each of these conditions simultaneously or as a set of selectable layers over a map of the local surroundings. Thus, the visual reference may display the extent of traffic conditions, weather patterns, or pollution conditions. The visual reference may further display the exact boundaries of active legal restrictions, such as emissions restrictions, noise restrictions, or speed limits. The visual reference may further display one or more navigable routes for a vehicle to travel to arrive at a desired destination locus. In some embodiments, the visual reference may comprise other displays providing a vehicle operation display. The vehicle operation display may comprise metrics such as speed, tachometry, stoichiometry, fuel status, fuel consumption, or odometer readings. Vehicle operation data may further comprise warning indicators reflective of abnormal operations, diagnostic codes, or other data useful to a user to monitor the operational condition of the vehicle.

Figure 3:
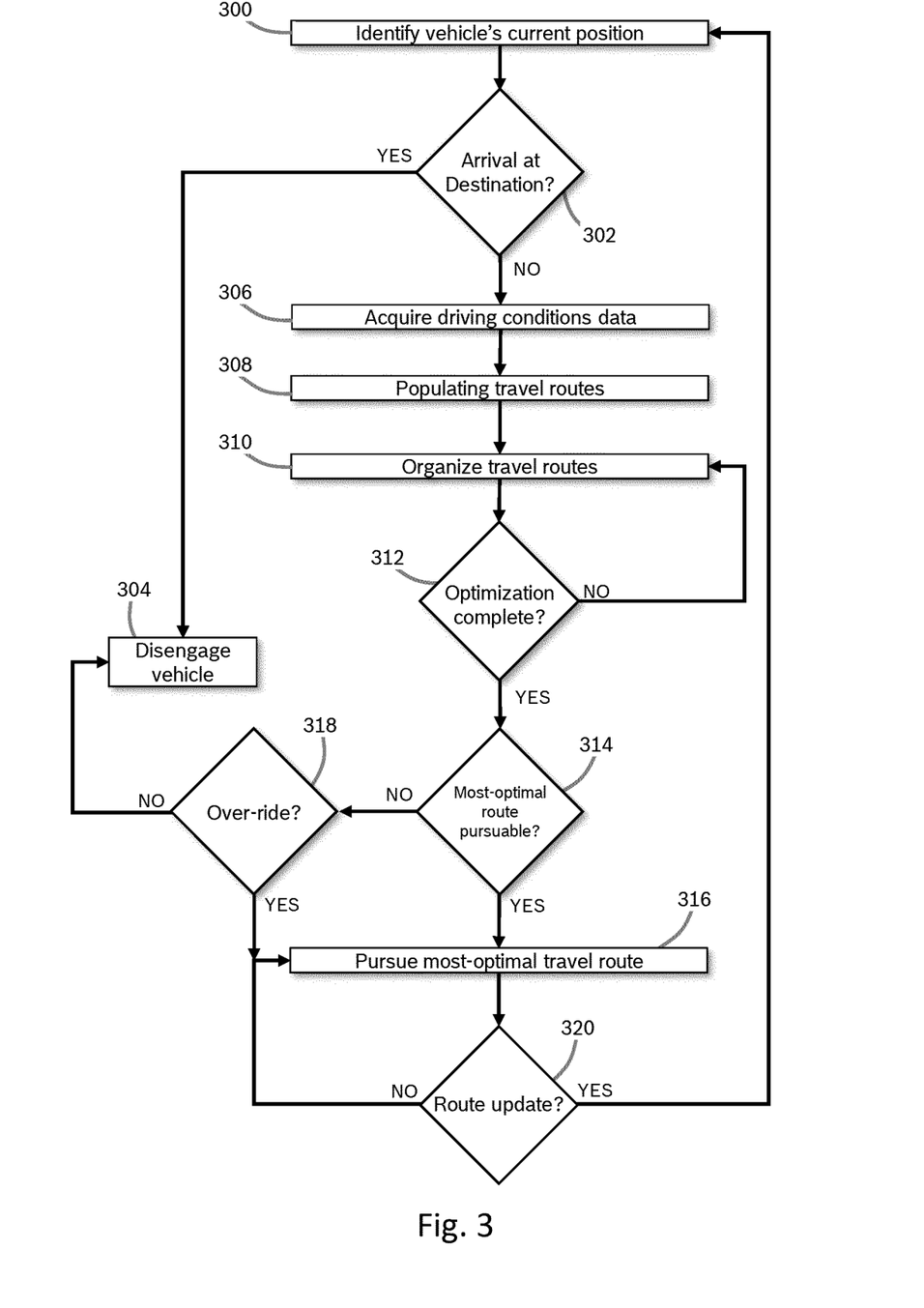
FIG. 3 is a flowchart illustrating a method of adjusting the behavior of a vehicle having autonomous functions.

FIG. 3 is a flow chart representing a method of controlled navigation of a vehicle having at least some autonomous functions. The controlled navigation is initiated with respect to a destination locus. The method beings at step 300, wherein the current position of the vehicle is identified. Identification of the position provides an origin locus for the navigation method, and may incorporate sensors of the vehicle, such as global positioning system (GPS) sensors to measure the GPS coordinates of the vehicle.

After the current position is identified and assigned to an origin locus, the method proceeds to step 302, where it is determined where the vehicle has arrived at the destination locus. If the vehicles origin locus matches the destination locus, then the navigation is complete, and the vehicle is disengaged at step 304, and the method is complete until such time that it is reinitiated with a new destination locus.

If the vehicle has not yet arrived at the destination locus, driving conditions data are acquired at step 306. Driving conditions data may be acquired using sensors of the vehicle, provided by electronic control units of the vehicle, or received from a data source external to the vehicle.

After the driving conditions data is acquired a number of navigable travel routes are populated between the origin locus and the destination locus in step 308. In some embodiments, all possible navigable routes may be populated. In some embodiments, a predetermined number of navigable routes may be populated as a maximum data set, which may advantageously improve processing time if a large number of navigable travel routes are possible.

Once the set of travel routes is fully populated, the method enters into a conditional loop at step 310. Starting at step 310, the travel routes are organized according to a hierarchy of priority factors. In the first iteration of the loop, the primary priority factor is used to arrange the travel routes from best-matching of the priority factor to worst-matching. In order to reduce ambiguous results (e.g., more than one travel route best matches the top priority factor), the method determines how many levels of the hierarchy of priority factors have been addressed at step 312. If at least one level of the hierarchy of priority factors has not been used to optimize the results, the method returns to step 310, now using the next-highest priority factor in the hierarchy as an organizing factor. This iterative process continues until all priority factors within the hierarchy have been utilized to further organize the travel routes. If all the levels of the hierarchy of priority factors have been addressed, then the travel routes have been optimized to the full extent of the hierarchy, a most-optimal route conforming to the hierarchy has been determined, and the method advances to step 314.

At step 314, it is determined if the most-optimal route is pursuable by the vehicle within the confines of the hierarchy of priority factors. If the most-optimal route is pursuable, the method advances to step 316. In some embodiments the hierarchy of priority factors may comprise operational thresholds or limits that must be satisfied. In such embodiments, the most-optimal travel route may be insufficient to permit navigation. For example, a priority factor may comprise a legal emissions limit of the vehicle when traveling through a particular municipality, such as a driving-restriction day declared by a city during days when the air quality is particularly low. If the vehicle cannot operate within the required thresholds or limits, the method may proceed to step 304 to disengage the vehicle until such time that the conditions may be satisfied. In some embodiments, if no travel route exists that can satisfy the hierarchy of priority factors, then there is no most-optimal route, and it is impossible to advance to step 316. In some embodiments, the method may at step 310 omit travel routes that fail to properly satisfy one or more of the priority factors having a threshold or limit condition. In the depicted embodiment, if the most-optimal route is not pursuable, the method instead advances to step 318.

At step 318, it is determined if there is an over-ride available for activation to neglect one or more of the priority factors in the hierarchy of priority factors. For example, a local municipality may restrict vehicle operations on days when the air quality is particularly low by requiring the payment of a fee to operate any vehicle not conforming to emissions requirements. If the fee is paid, an over-ride is activated, and the vehicle may proceed to step 316. If no over-ride option is available, or if no most-optimal route exists conforming to the hierarchy, the method proceeds to step 304 to disengage the vehicle operation until such time that a successful navigation can be achieved. In some embodiments, the over-ride option at step 318 may be omitted.

At step 316, the vehicle pursues the most-optimal route until a condition is met requiring a route update at step 320. If no route update condition has been met, the method returns to step 316 and the vehicle continues to pursue the most-optimal route. Route update conditions may comprise a predetermined length of travel time, a predetermined travel distance, a change in the hierarchy of priority factors, a change in the driving conditions data, an unexpected deviation from the most-optimal route during travel, a change in the passenger or cargo payload of the vehicle, or arrival at the destination locus. Once a route update condition has been achieved, the method returns to step 300. Some embodiments may have a different set of route update conditions, including conditions not disclosed herein. Some embodiments may have no route update conditions, and will instead only finish pursuing the most-optimal route upon arrival at the destination locus.

Figure 4:
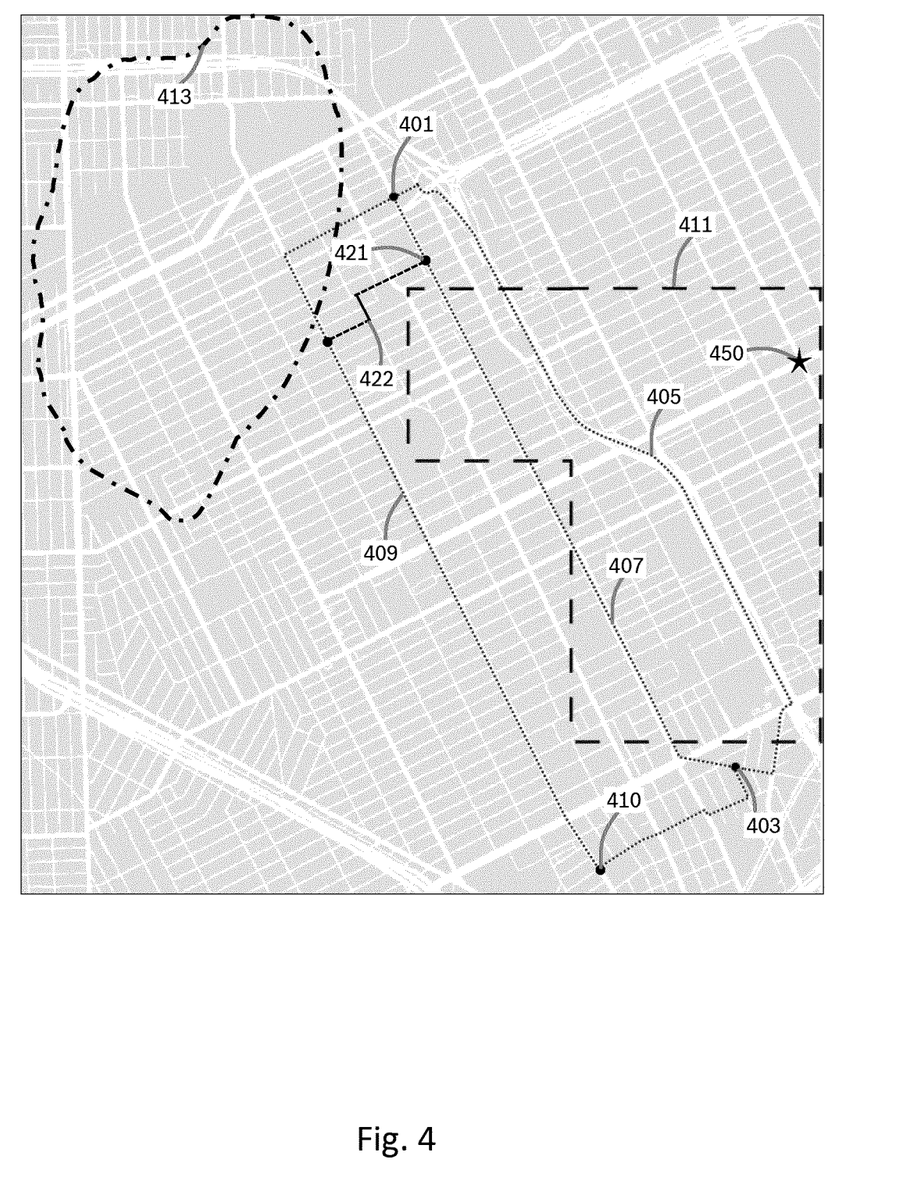
FIG. 4 shows a populated set of navigable routes for a vehicle between two points, the navigable routes being populated in accordance to a hierarchy of priority factors.

FIG. 4 is a map illustrating a navigable route selection for a vehicle having at least some autonomous functions. The vehicle begins the travel at origin locus 401, with a desired destination locus 403. The vehicle may populate a number of navigable travel routes, and in the depicted embodiment populates a first route 405, a second route 407 and a third route 409 based upon the navigational and traffic conditions in a set of combined driving data. A most-optimal route may be determined based upon a hierarchy of priority factors.

For example, if the primary priority factor comprises a shortest travel time, first route 405 may be selected in order to utilize the highway to arrive at destination locus 403. If the primary priority factor comprises a shortest travel distance, second route 407 may be selected, which is the most direct route to the destination locus amongst the three populated routes. If the primary priority factor comprises passing by an additional locus 410, third route 409 may be selected.

The map additionally illustrates a restricted-emissions zone 411. Restricted-emissions zone 411 is an area demarcated by a dotted line indicating a zone in which the local municipality has imposed restricted vehicle emissions. For the purposes of this example, and not limitation, the vehicle may not conform to the legally-required emissions standards within restricted-emissions zone 411. If the vehicle does not comply to the emissions standards, and legal restrictions are within the hierarchy of priority factors, the vehicle may utilize third route 409, which avoids restricted-emissions zone 411.

The map additionally illustrates a hazardous-road zone 413. Hazardous conditions may be caused by poor weather conditions, construction, or other environmental factors. In the depicted embodiment, the hazardous conditions comprise road flooding. If the hierarchy of priority factors includes a priority factor to avoid hazardous conditions, portions of third route 409 within the hazardous-road zone 413 should be avoided, and thus either first route 405 or second route 407 must be used.

In one embodiment, the hierarchy of priority factors for the vehicle comprises avoiding hazardous conditions, compliance with emissions limits, shortest travel distance and shortest travel time. In view of this hierarchy, none of the populated routes satisfy all conditions, and a different populated route must be utilized. In this embodiment, the vehicle may first travel along second route 407, which best satisfies the hierarchy until arrival at a locus 421. At locus 421, the vehicle turns right along a sub-route 422 to avoid entering restricted-emissions zone 411. Upon intersection of sub-route 422 with third route 409, the vehicle turns left to continue along third route 409, which best satisfies the hierarchy of priority factors for the remainder of the journey to destination locus 403. In some embodiments, this route may be selected upon initial travel from origin locus 401. In some embodiments, the vehicle may be operable to update its route in response to driving conditions frequently, for example every 10 seconds, and may therefore alter its travel path in real-time to respond to driving conditions.

For example, in another embodiment the hierarchy of priority factors may comprise compliance with emissions limits and fleet conditions, such that an entire fleet of vehicles must be considered collectively when determining compliance within restricted-emissions zone 411. The vehicle still starts at origin locus 401 and travels to destination locus 403. However, in this example a single vehicle from the fleet may be in compliance with the emissions standards of restricted-emissions zone 411, but not a plurality of vehicles from the fleet. As depicted in the current embodiment, a second vehicle 450 is within the restricted-emissions zone 411 at the start of travel from origin locus 401. Because both vehicles are associated with a fleet, a fleet processor has information describing their respective paths and may coordinate the vehicles. For example, if the fleet processor predicts that the second vehicle 450 will vacate restricted-emissions zone 411 before the vehicle enters, then the vehicle may utilize first route 405 to achieve the shortest travel time to destination locus 403. Otherwise, the vehicle may avoid restricted-emissions zone 411 until such time that second vehicle 450 is no longer within the zone. If the second vehicle 450 is not predicted to leave restricted-emissions zone 411, or does not otherwise leave restricted-emissions zone 411 because of unforeseen changes in its navigation, the vehicle may instead utilize another route that conforms to the hierarchy under such conditions (for example, third route 409). Alternatively, if an over-ride option is accessible to the vehicle or the fleet of vehicles by paying a fee, a transfer of funds may be initiated to permit the vehicle to traverse restricted-emissions zone 411 even while the second vehicle 450 is still within its bounds.

If destination locus 403 is not approachable using any navigable route conforming to the hierarchy of priority factors, the vehicle may disengage until such time that destination locus 403 is approachable, an available over-ride is activated, or the hierarchy of priority factors is reconfigured such that destination locus 403 is approachable.

The priority factors used for determining navigation may comprise travel time, travel distance, navigation data, road conditions, vehicle operation conditions, weather conditions, pollution conditions, fleet conditions, legal compliance, travel costs, fuel consumption or any other priority factor useful in determining navigation known to one of ordinary skill without deviating from the teachings herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An iterative method of optimizing a route of a vehicle in a current locus traveling to a destination locus, the optimization based on a configurable hierarchy of priority factors, the method comprising:
   iteratively performing, until the current locus of the vehicle matches the destination locus, the steps of:
      identifying the current locus of the vehicle;
      receiving a first set of data comprising at least one of navigational data, traffic conditions data, and weather conditions data;
      receiving a second set of data comprising at least one of vehicle operations data and pollution conditions data;
      combining the first set of data and the second set of data to form a set of driving conditions data;
      populating a number of travel routes that are navigable by the vehicle between the current locus of the vehicle and the destination locus to form a set of routes;
      prioritizing the routes of the set of routes based upon the driving conditions data and the priority factors in the configurable hierarchy of priority factors to form a prioritized set of routes, the priority factors comprising at least one of vehicle restrictions and local legal restrictions;
      operating the vehicle according to an optimized route of the prioritized set of routes until a route update condition has been satisfied, the optimized route being a route of the prioritized set of routes having the highest priority based on the priority factors; and
      receiving inputs from a user of the vehicle corresponding to a reconfiguration of the hierarchy of priority factors, the reconfiguration configured to change the prioritization of the routes so that a different route is the optimized route;
   and
   wherein prioritizing the routes of the set of routes comprises:
      prioritizing the routes of the set of routes based upon the driving conditions data and certain priority factors of the hierarchy of priority factors to identify a first route and a second route that each have the highest priority; and
      prioritizing at least the first route and the second route based on at least one additional priority factor of the hierarchy of the priority factors to identify the first route as having a higher priority than the second route and the first route as having the highest priority, wherein the first route is the optimized route.

2. The method of claim 1, wherein the route update condition comprises elapsing of a period of time or traversal of a distance by the vehicle.

3. The method of claim 1, further comprising:
   reconfiguring the hierarchy of the priority factors,
   wherein the route update condition comprises the reconfiguration of the hierarchy of the priority factors.

4. The method of claim 1, wherein the optimized route corresponds to no further travel of the vehicle when none of the routes of the set of routes conforms to the priority factors in the configurable hierarchy of priority factors and no further travel of the vehicle has the highest priority based on the priority factors.

5. The method of claim 4, further comprising:
   reconfiguring the hierarchy of the priority factors when none of the routes of the set of routes conforms to the priority factors within a threshold limit.

6. The method of claim 1, wherein the priority factors further comprise at least one of travel distance, travel time, emissions output, and travel cost.

7. The method of claim 1, wherein:
   the vehicle belongs to a coordinated fleet of vehicles, and
   the priority factors further comprise fleet conditions.

* * * * *